Patented Mar. 10, 1942

2,276,202

UNITED STATES PATENT OFFICE 2,276,202

STILBENE DYESTUFFS AND THEIR MANUFACTURE

Ernst Keller, Basel, Switzerland, assignor to J. R. Geigy A. G., Basel, Switzerland, a firm No Drawing. Application September 5, 1939, Serial No. 293,483. In Switzerland September 13, 1938

12 Claims. (Cl. 260—143)

This invention relates to a process for the production of stilbene dyestuffs, whereby products with substantially improved properties of fastness can be produced.

It is well known to condense, if necessary under pressure, dinitrostilbene disulphonic acid, dinitrodibenzyl disulphonic acid or the transformation products of p-nitrotoluene sulphonic acid, in molecular or suitable proportions, with aromatic amino compounds, especially monoaminoazo dyestuffs or mixtures of these dyestuffs. A subsequent treatment of the condensation products with metal yielding and/or oxidising media, leads to derivatives with improved fastness properties.

According to the present process products with substantially improved properties of fastness are produced by using wholly or partly in the above mentioned reaction, instead of the known aromatic amino compounds, aminoazobenzene compounds of the formula:

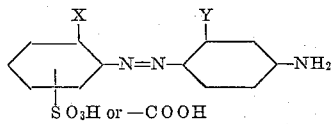

wherein X represents a hydroxyl, alkoxy or carboxyl group, or a substituent exchangeable for hydroxyl, for example halogen, and Y represents a hydroxyl or alkoxy group or, but not at the same time with X, a substituent exchangeable for hydroxyl.

The two benzene nuclei of the aminoazobenzene dyestuff may be further suitably substituted, the sole condition being that the nucleus, which contains the amino group, can only contain substituents at the positions which do not render impossible the formation of the aminoazobenzene dyestuff. Further the amino group, as is known, may contain substituents which are split off by alkalies.

The production of the aminoazobeneze dyestuffs according to the above formula is effected by usual processes by coupling the diazobenzene sulphonic or carboxylic acids, which arise, with the aniline derivatives substituted in the metaposition. As first components may be mentioned for example: 2-amino-1-hydroxybenzene-4-sulphonic acid, 4-chloro-2-amino-1-hydroxybenzene-6-sulphonic acid, 4-chloro-2-amino-1-hydroxybenzene-5-sulphonic acid, 6-chloro-2-amino-1-hydroxybenzene-4-sulphonic acid, 3-amino-2-hydroxy-5-sulphobenzoic acid, 2-amino-4-sulphobenzoic acid, 2-amino-4-methoxybenzoic acid, 3-amino-4-methoxy- or -4-hydroxy-benzoic acid, and 2-amino-1-hydroxybenzene-4:6-disulphonic acid. As coupling components there arise: m-aminophenol, or its derivatives which ensure a coupling in another than in p-position to the hydroxyl group, as for example m-aminophenol-ω-methanesulphonic acid, m-anisidine or m-methoxyphenylaminomethyl sulphonic acid, 2:5-dimethoxyaniline, 2-amino - 4 - hydroxytoluene, and 1-amino-2-methyl-5-methoxybenzene.

For the condensation of these aminoazobenzene compounds with dinitrostilbene disulphonic acids or their equivalents, there arise all possibilities of variation which have become known. There may be mentioned particularly: reaction with or without pressure, use of materials in molecular or suitable proportions, use of mixtures of aromatic amino compounds already used for this reaction with the aminobenzene derivatives, proposed according to this invention, or of mixtures of these last mentioned compounds. The subsequent treatment with metal yielding and/or oxidising agents may also be effected in known manner.

The dyestuffs obtained are characterised relatively to the corresponding metal-free or the known dyestuffs, in general by a considerably improved light fastness, partly by improved fastness to washing, alkalies or acids, partly by improvement of all these fastness properties. The new dyestuffs dye cotton in brown-orange to deep brown, olive, grey to grey-blue shades, whereby a considerable broadening of the shade scale of stilbene dyestuffs is obtained. These results were not foreseen and constitute an important technical advance.

It is already known to use for this condensation reaction aminoazobenzene compounds containing alkoxy groups, as for example 6 - methoxy - 1 - aminoazobenzene - 3' - sulphonic acid, and 3:6-dimethoxy-1-aminoazobenzene-4'-sulphonic acid. The comparable product according to the present process, produced with an aminoazobenzene dyestuff, which contains a methoxy group in the o-position to the azo group in the coupling component, instead of in the ortho position to the amino group, is substantially superior to the analogous known dyestuffs as regards fastness properties, especially as regards light fastness, after metallising, for example coppering.

In the following examples the parts are by weight.

*Example 1*

38 parts of the dyestuff, produced by coupling diazotised 4-chloro-2-amino-1-hydroxybenzene- 6-sulphonic acid with 2-amino-4-hydroxytoluene in soda alkaline solution and 47.4 parts of sodium dinitrostilbene disulphonic acid are heated for 12 hours by reflux to boiling in a stirring boiler with 400 parts of water and 70 parts of soda lye of 36° Bé. After cooling the soda lye is neutralised with hydrochloric acid, the dyestuff is completely precipitated with cooking salt and filtered.

The still moist filter cake is dissolved in 1,600 parts of water at 80° C. and treated with a solution produced from 25 parts of crystallised copper sulphate in 100 parts of water and 75 parts of 25% ammonia. It is heated to 80–90° C. for 6 hours under reflux. The sample which is salted out and made slightly acid with acetic acid should still indicate a trace of copper excess with potassium ferricyanide, should this not be the case some ammoniacal copper sulphate solution is added. The copper compound which has been partly precipitated is now salted out completely and filtered.

The dried dyestuff constitutes a dark brown powder, it dissolves in water with a yellow-brown colour, in concentrated sulphuric acid with a violet colour and dyes cotton in very light-fast brown shades.

When in the above example but with otherwise similar proportions, only 23.7 parts of dinitrostilbene disulphonic acid are used, a similar dyestuff of a somewhat darker shade is obtained.

Further similar dyestuffs are obtained when in the above example 4-chloro-2-amino-1-hydroxybenzene-6-sulphonic acid, is replaced for example by 2 - amino-1-hydroxybenzene-4-sulphonic acid.

Example 2

64.6 parts of the dyestuff, produced by coupling diazotised 2-amino-1-hydroxybenzene-4-sulphonic acid with m-anisidine in a weak litmus acid solution, if necessary in the presence of naphthalene-2-sulphonic acid, are condensed with 47.4 parts of sodium dinitrostilbene di-sulphonic acid in 500 parts of water and 100 parts of soda lye of 36° Bé. for 18 hours at 100–105° C. After neutralising the soda lye with hydrochloric acid the dyestuff is salted out completely and filtered.

The still moist filter cake of dyestuff is dissolved in about 3,000 parts of water at 80° C. and coppered with an amoniacal copper sulphate solution, produced from 50 parts of crystallised copper sulphate, dissolved in 200 parts of water, 150 parts of 25% ammonia, for 6 hours at 80–90° C. as in Example 1.

The dyestuff constitutes when dried a dark grey powder, it dissolves in water with a brown-red colour, in concentrated sulphuric acid with a blue colour and dyes cotton in very light-fast deep brown shades.

When in the above example the m-anisidine is replaced by 2:5-dimethoxyaniline and the condensation is carried out as in the above example, a dyestuff is obtained which dyes cotton in very light-fast grey shades.

When the dyestuff, coppered according to the above indication, is dissolved in 1,000 parts of water and 20 parts of soda lye 30° Bé., has added thereto slowly a solution of 300 parts of sodium hypochlorite (7% active chlorine), is heated to boiling for 1 hours, neutralised and salted out, there is obtained a somewhat greener product of similar properties.

By varying the proportions of aminoazobenzene dyestuff to dinitrostilbene disulphonic acid and by modifying the condensation conditions, for example: modifying the condensation volume, the alkalinity or increasing the condensation temperature, dyestuffs are obtained which, after coppering, dye cotton in olive to greeny-grey shades of good light fastness.

If instead of the dinitrostilbene-disulphonate in the above example 64.6 parts of the dyestuff 2-amino - 1 - hydroxybenzene-4-sulphonic acid →m-anisidine are condensed with 95.6 parts of p-nitrotoluenesulphonic acid, a dyestuff is obtained which dyes cotton violet-brown shades when coppered in substance or on the fibre.

Example 3

32.3 parts of the dyestuff, produced by coupling diazotized 3-amino-4-methoxybenzoic acid with 2-amino-4-hydroxytoluene in weak litmus acid solution, are condensed for 18 hours at 100–105° C. with 47.4 parts of sodium salt of dinitrostilbene disulphonic acid in 330 parts of water and 70 parts of soda lye 36° Bé. and converted into the copper compound as described in Example 1.

The dried dyestuff constitutes a dark brown powder which dissolves in water with a brown colour, in concentrated sulphuric acid with a violet colour and dyes cotton in fast brown shades.

Example 4

33.7 parts of the dyestuff, produced by coupling diazotized 2-amino-4-sulphobenzoic acid with 1-amino-2-methyl-5-methoxybenzene in weak litmus acid solution are condensed by reflux for 12 hours at boiling temperature with 47.4 parts of sodium salt of dinitrostilbene disulphonic acid in 330 parts of water and 70 parts of soda lye of 36° Bé. The dyestuff is isolated in the usual manner. When dried it constitutes a dark brown powder, dissolves in water with an orange colour and in concentrated sulphuric acid with a blue colour and dyes cotton in fast brown-orange shades. Subsequently treated on the fibre with copper sulphate there is obtained a brown of similar fast properties.

When the condensation product produced according to the above example is dissolved in 1200 parts of water, acidified with acetic acid to a weak litmus acid reaction, treated with a solution of 25 parts of crystallised copper sulphate in 100 parts of water, and stirred for 6 hours at 80–90° C. and the dyestuff is worked up as usual, there is obtained a product which dyes cotton in brown shades of similar fast properties.

Example 5

35.3 parts of the dyestuff, produced by coupling diazotised 2-amino - 1 - hydroxybenzene - 4 - sulphonic acid with 2:5-dimethoxyaniline in weak litmus acid solution and 30 parts of sodium salt of p-aminoazobenzene-p'-sulphonic acid are condensed for 18 hours at boiling temperature with 47.4 parts of sodium salt of dinitrostilbene di-sulphonic acid in 500 parts of water and 100 parts of soda dye 36° Bé., and isolated in the usual manner. The condensation product is dissolved in 1600 parts of water and stirred for 18 hours at 95–100° C. with a solution of 25 parts of crystallised copper sulphate in 100 parts of water and 75 parts of 25% ammonia and the coppered dyestuff is isolated in the usual manner.

The dried dyestuff constitutes a black powder. It dissolves in water brown-olive; in concentrated sulphuric acid it is soluble with difficulty with a blue-black colour and dyes cotton in fast grey-olive shades.

If in the above example p-aminoazobenzene-p'-sulphonic acid is replaced by dihydrothio-p-toluidinesulphonic acid, a dyestuff of similarly good fastness properties is obtained, which dyes cotton yellowish-olive shades.

On replacing p-aminoazobenzene-p'-sulphonic acid by the dyestuff sulphanilic acid→1-amino-3-methyl-6-methoxybenzene, a dyestuff is obtained which dyes cotton grey-brown shades of very good fastness to light.

A similar dyestuff is obtained if in the above example the dinitrostilbenedisulphonate is replaced by 47.6 parts of the sodium salt of the dinitrodibenzyldisulphonic acid.

*Example 6*

36.8 parts of the dyestuff prepared as in Example 2 by coupling 6-nitro-2-amino-1-hydroxybenzene-4-sulphonic acid with m-anisidine are condensed with 47.4 parts of dinitro-stilbenedisulphonate of sodium in 250 parts of water and 50 parts of caustic soda lye of 36° Bé. for 12 hours at 100–105° C. and coppered as described in Example 2.

The obtained dyestuff, when dried, constitutes a dark powder, which dissolves in water with brown-red, in $H_2SO_4$ with blue color and dyes cotton violet-brown shades fast to light.

If in the above example the 6-nitro-2-amino-1-hydroxybenzene-4-sulphonic acid is replaced by the 4-nitro-2-amino-1-hydroxybenzene-6-sulphonic acid, a dyestuff of similarly good fastness properties is obtained, which dyes cotton a full brown.

A further dyestuff with the same good fastness properties, which also dyes cotton a full brown, is obtained if one uses the 6-chloro-2-amino-1-hydroxybenzene-4-sulphonic acid as diazo component instead of the 6-nitro-2-amino-1-hydroxybenzene-4-sulphonic acid.

*Example 7*

33.5 parts of the dyestuff 2-amino-1-hydroxybenzene-4-sulphonic acid→m-anisidine, described in Example 2, and 30 parts of p-aminoazobenzene-p'-sulphonate of sodium are condensed in the usual manner with 47.4 parts of dinitrostilbenedisulphonate of sodium in 500 parts of water and 100 parts of caustic soda lye of 36° Bé. and converted into the copper lacquer.

The dry dyestuff constitutes a deep-brown powder, which dissolves in water with brown and in concentrated sulphuric acid with blue colour and dyes cotton fast, full, brown shades.

If in the above example the m-anisidine is replaced by m-phenetidine, a dyestuff with almost the same properties is obtained, which also dyes cotton a full brown.

A further similar dyestuff is obtained if in the above example the p-aminoazobenzene-p'-sulphonic acid is replaced by the dyestuff sulphanilic acid→2:5-dimethylaniline. The dyestuff dyes cotton a somewhat darker brown fast to light.

*Example 8*

34.2 parts of the dyestuff prepared by coupling the 1-amino-2-chlorobenzene-5-sulphonic acid with 2-amino-4-hydroxytoluene in a feebly litmus-acid solution are condensed on the reflux with 47.4 parts of dinitrostilbenedisulphonate of sodium in 330 parts of water and 70 parts of caustic soda lye of 36° Bé. for 6 hours at boiling temperature and the condensation product coppered as described in Example 5 or in the autoclave at 101–105° C., if desired in presence of NaOH. The obtained dyestuff, when dried, constitutes a dark brown powder, which dissolves in water with yellow and in concentrated sulphuric acid with blue-red colour and dyes cotton yellow-brown shades fast to light.

If in the above example the 1-amino-2-chloro-5-sulphonic acid is replaced by the 1-amino-2-chlorobenzene-4-sulphonic acid, a similar dyestuff is obtained, which also dyes cotton yellow-brown shades.

*Example 9*

37.2 parts of the dyestuff prepared by coupling 1-amino-2-chlorobenzene-4-sulphonic acid with 2:5-dimethoxy-aniline in weakly acid solution, advantageously in presence of naphthalene-2-sulphonic acid, are condensed on the reflux with 47.4 parts of dinitrostilbenedisulphonate of sodium in 300 parts of water and 60 parts of caustic soda lye of 36° Bé. for 18 hours at boiling temperature and washed up in the usual manner.

The dyestuff is dissolved in 1500 parts of water neutral or feebly alkaline and coppered on the reflux or in a closed vessel with an ammoniacal copper sulphate solution, prepared from 25 parts of crystalline copper sulphate dissolved in 100 parts of water and 80 parts of ammonia of 25%, for 18 hours at boiling temperature. The coppering may also be performed according to other known convenient methods.

The dry dyestuff constitutes a dark, violet-brown powder, dissolves in water with orange and in concentrated sulphuric acid with blue-violet colour and dyes cotton brown-red shades fast to light.

If in the above example one uses, instead of 47.4 parts, only 23.7 parts of dinitrostilbenedisulphonate of sodium for the condensation, while working for the rest in the same manner as above, a dyestuff with similarly good properties is obtained, which on dyeing yields a somewhat bluisher red-brown.

What I claim is:

1. In the manufacture of stilbene dyestuffs by condensation of dinitrostilbene disulphonic acid, dinitrodibenzyl disulphonic acid or p-nitrotoluene sulphonic acid with aromatic compounds, which contain free amino groups in any desired proportion, in presence of caustic alkalies, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulphonic acid, dinitrodibenzyl disulphonic acid and p-nitrotoluene sulphonic acid at least one molecule of an aminoazobenzene dyestuff of the formula

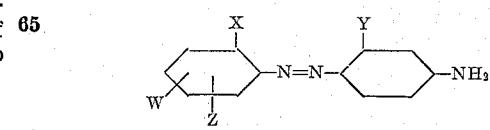

wherein X represents one member of the group consisting of hydroxyl, alkoxy, carboxyl and halogen, Y represents one member of the group consisting of hydroxyl, alkoxy and, not when X does, halogen, Z represents one member of the group consisting of SO₃H and COOH, and W represents one member of the group consisting of H, NO₂ and Cl.

2. In the manufacture of stilbene dyestuffs by condensation of dinitrostilbene disulphonic acid, dinitrodibenzyl disulphonic acid p-nitrotoluene sulphonic acid with aromatic compounds, which contain free amino groups in any desired proportion, in presence of caustic alkalies, with or without the application of pressure, and if desired subsequent treatment of the products with metal yielding and/or oxidising agents, the improvement wherein instead of the known aromatic amino compounds there are used aminoazobenzene dyestuffs of the formula

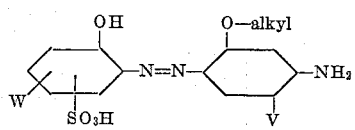

wherein W represents one member of the group consisting of H, NO₂ and Cl and V represents one member of the group consisting of H, CH₃ and OCH₃.

3. In the manufacture of stilbene dyestuffs by condensation of dinitrostilbene disulphonic acid, dinitrodibenzyl disulphonic acid or p-nitrotoluene sulphonic acid with aromatic compounds, which contain free amino groups in any desired proportion, in presence of caustic alkalies, with or without the application of pressure, and if desired subsequent treatment of the products with metal yielding and/or oxidising agents, the improvement wherein instead of the known aromatic amino compounds there is used an aminoazobenzene dyestuff of the formula

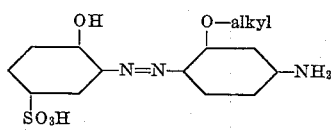

4. In the manufacture of stilbene dyestuffs, the step of condensing two molecular proportions of an aminoazobenzene dyestuff of the formula

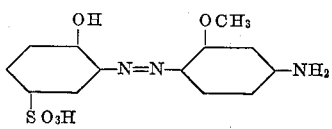

with one molecular proportion of dinitrostilbene disulphonic acid.

5. In the manufacture of stilbene dyestuffs, the step of condensing one molecular proportion of

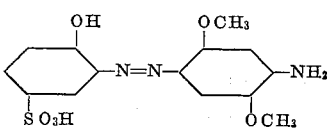

and one molecular proportion of

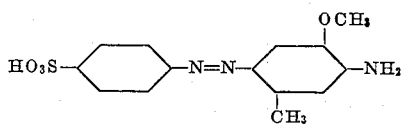

with one molecular proportion of dinitrostilbene disulphonic acid.

6. In the manufacture of stilbene dyestuffs, the step of condensing one molecular proportion of

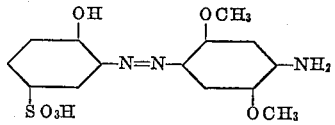

and one molecular proportion of

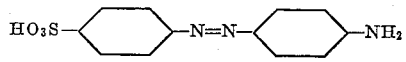

with one molecular proportion of dinitrostilbene disulphonic acid.

7. The new stilbene dyestuffs from the condensation with dinitrostilbene disulphonic acid of an aminoazobenzene dyestuff

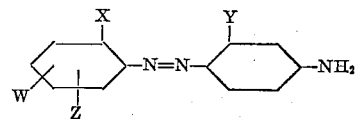

wherein X represents one member of the group consisting of hydroxyl, alkoxy, carboxyl and halogen, Y represents one member of the group consisting of hydroxyl, alkoxy and, not when X does, halogen, Z represents one member of the group consisting of SO₃H and COOH, and W represents one member of the group consisting of H, NO₂ and Cl.

8. The new stilbene dyestuffs from the condensation with dinitrostilbene disulphonic acid of an aminoazobenzene dyestuff of the formula

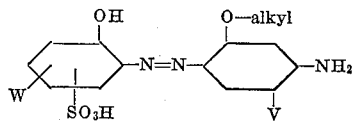

wherein W represents one member of the group consisting of H, NO₂ and Cl and V represents one member of the group consisting of H, CH₃ and OCH₃, said dyestuffs having improved fastness properties.

9. The new stilbene dyestuffs from the condensation with one molecular proportion of dinitrostilbene disulphonic acid of two molecular proportions of an aminoazobenzene dyestuff of the formula

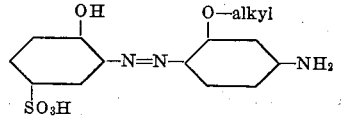

said dyestuffs having improved fastness properties.

10. The new stilbene dyestuff from the condensation with one molecular proportion of dinitrostilbene disulphonic acid of two molecular proportions of an aminoazobenzene dyestuff of the formula

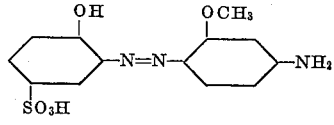

said dyestuffs having improved fastness properties.

11. The new stilbene dyestuff from the condensation with one molecular proportion of dinitrostilbene disulphonic acid of one molecular proportion of

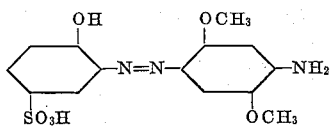

and one molecular proportion of

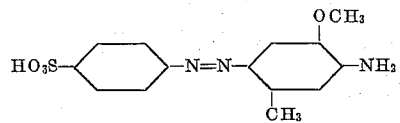

said dyestuff having improved fastness properties.

12. The new stilbene dyestuff from the condensation with one molecular proportion of dinitrostilbene disulphonic acid of one molecular proportion of

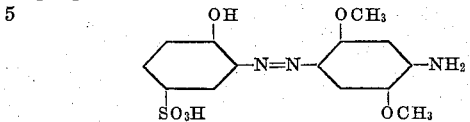

and one molecular proportion of

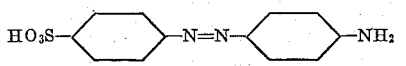

said dyestuff having improved fastness properties.

ERNST KELLER.